(12) United States Patent
Zikes

(10) Patent No.: US 7,377,120 B2
(45) Date of Patent: May 27, 2008

(54) HVAC TWINNING CONTROL

(75) Inventor: Bradley C. Zikes, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 483 days.

(21) Appl. No.: 11/236,768

(22) Filed: Sep. 27, 2005

(65) Prior Publication Data
US 2007/0068179 A1 Mar. 29, 2007

(51) Int. Cl.
F25B 7/00 (2006.01)
(52) U.S. Cl. ........................................................ 62/175
(58) Field of Classification Search ............... 62/127, 62/129, 155, 175; 165/11.1; 236/1 E, 1 EA, 236/49.3
See application file for complete search history.

(56) References Cited

U.S. PATENT DOCUMENTS 5,316,073 A * 5/1994 Klaus et al. ................ 165/11.1
5,727,928 A * 3/1998 Brown .................... 417/44.11

* cited by examiner

*Primary Examiner*—Cheryl J. Tyler
*Assistant Examiner*—Joseph Corrigan
(74) *Attorney, Agent, or Firm*—Harness, Dickey & Pierce, P.L.C.

(57) ABSTRACT

A control is provided for a first HVAC unit that is coupled to a common duct shared with at least one other HVAC unit. The control comprises a twinning connection for communication with at least a second control of another HVAC unit, and a voltage signal applied to the twinning connection. The control further comprises a switching means for switching the voltage signal to ground. A microcomputer for monitoring the twinning connection and for controlling the switching means is configured to actuate the switching means to switch the voltage at the twinning connection to ground for a predetermined time period to communicate a blower speed for the first HVAC unit. The microcomputer monitors the twinning connection to sense the duration that the voltage at the twinning connection is being conducted to ground, and responsively controls the speed of the first HVAC blower according to the prescribed blower speed corresponding to the sensed duration.

20 Claims, 3 Drawing Sheets

HVAC TWINNING CONTROL

The present invention relates generally to controllers used in temperature controlling systems such as HVAC (heating, ventilating, air-conditioning) systems. More specifically, the invention relates to an interface such as a twinning control for controlling the operation of two heating/cooling appliances such as HVAC units.

BACKGROUND OF THE INVENTION

Certain large homes require more heating or cooling than can be provided by a single residential HVAC unit. Instead of installing a larger commercial HVAC unit, installers may install two residential furnaces side by side with shared common ducting. This effectively increases the amount of heat that can be distributed into the home. Both furnaces operate from one thermostat, and ideally operate in the same mode at the same time. Such an arrangement is referred to as a twinned system. One aspect of a twinned system is that the circulator blowers should operate at the same speed. If one HVAC system operates its blower at a different speed than the other HVAC system, there would be different pressure drops across the units that would cause air from one unit to be forced into the other unit. This different pressure condition can cause problems if one unit's blower operation depends on a safety switch, or a different time delay period than the other unit.

SUMMARY OF THE INVENTION

The various exemplary embodiments of an HVAC control provide for twinning of at least two HVAC units that are operatively coupled to a common duct. In one embodiment, a twinning arrangement is provided that comprises a control associated with a first HVAC unit that is coupled to a common duct shared with at least one other HVAC unit. The control comprises a twinning connection in communication with at least one other control associated with the at least one other HVAC unit, and a sensing means for sensing when a voltage at the twinning connection is being conducted to ground. The control provides a low voltage signal that is applied to the twinning connection through the sensing means. The control further comprises a switching means for switching the voltage at the twinning connection to ground, and a microcomputer for monitoring the sensing means and for controlling the switching means. The microcomputer is configured to actuate the switching means to switch the voltage at the twinning connection to ground for a predetermined time period, to communicate a blower speed for the first HVAC unit to the at least one other control. The microprocessor also monitors the sensing means to determine the period of time that the voltage at the twinning connection is being conducted to ground, and responsively controls the speed of the blower associated with the first HVAC unit according to a prescribed blower speed corresponding to the sensed period of time.

In another aspect of twinning at least two HVAC units, a combination of a first control associated with a first HVAC unit with at least a second control associated with at least a second HVAC unit is provided. The combination of first and second twinning controls comprises a twinning connection between the first control and the at least second control, which provides communication of a signal indicative of a blower speed for each HVAC unit. The combination of a first control and at least a second control further comprises a low voltage source applied to the twinning connection. The first control has a microcomputer for controlling a switching means for switching the voltage at the twinning connection to ground, and a sensing means for sensing when the voltage at the twinning connection is being conducted to ground. The microprocessor of the first control is configured to actuate the switching means to switch the voltage at the twinning connection to ground for a predetermined time period to communicate a blower speed for the first HVAC unit to the at least second control. The second control has a microcomputer for controlling a switching means for switching the voltage at the twinning connection to ground, and a sensing means for sensing when the voltage at the twinning connection is being conducted to ground. The microprocessor of the second control is configured to actuate the switching means to switch the voltage at the twinning connection to ground for a predetermined time period to communicate a blower speed for the second HVAC unit. The microcomputer of the first control and the microcomputer of the at least second control both monitor the twinning connection to sense the period of time that the voltage at the twinning connection is being conducted to ground, which time period corresponds to a prescribed blower speed for each HVAC unit. Each control responsively controls the speed of the blower associated with its respective HVAC unit according to the prescribed blower speed corresponding to the sensed period of time Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Corresponding reference numerals indicate corresponding parts throughout the several views of the drawings.

DETAILED DESCRIPTION OF THE EMBODIMENTS

The following description of the various embodiment(s) is merely exemplary in nature and is in no way intended to limit the invention, its application, or uses.

Figure 1:
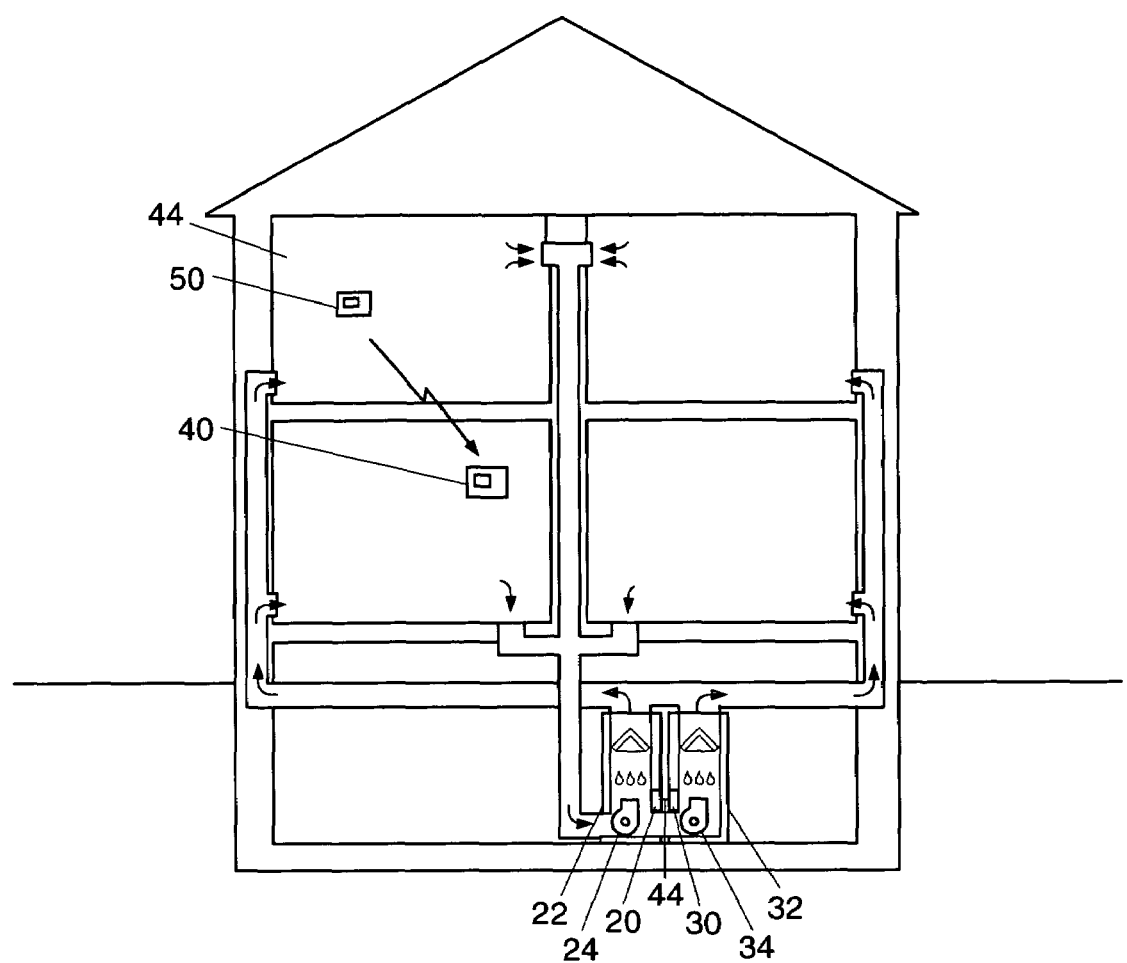
FIG. 1 is a side elevation view of a building having at least two HVAC systems with common ducting, utilizing twinned controls in accordance with the principles of the present invention.

In one exemplary embodiment shown in FIG. 1, a control 20 for controlling a first HVAC unit 22 is provided that communicates with a like control 30 for controlling a second HVAC unit 32. The HVAC units 22 and 32 may be a heating, cooling, air-conditioning, or other temperature control apparatus, and preferably are coupled to a common shared duct. Each of the controls 20 and 30 provide an interface between a thermostat 40 in the space 42 and each of the HVAC units 22 and 32. The thermostat 40 accordingly sends signals to both HVAC controls 20 and 30 for initiating heating or cooling operation for a controlled space 42 such as a building. The twinning control may be used to control any number of HVAC units, but is described herein as controlling first and second HVAC units 22 and 32.

The first HVAC unit 22 includes a blower 24 having a fan motor, and the second HVAC unit 32 includes a blower 34 having a fan motor. Each blower forces air out of the HVAC unit and into the controlled space 42. The controls 20 and 30 for the two HVAC units 22 and 32 are each individually connected to a low voltage alternating current voltage supply, such as a 24 volt alternating current (vac) transformer. It should be noted that one control 20 may be connected to a 24 vac transformer that is out of phase with the second 24 vac transformer connected to the other control 30, such that the voltage of each transformer crosses zero at the same time but one voltage is rising and the other is falling.

Figure 3:
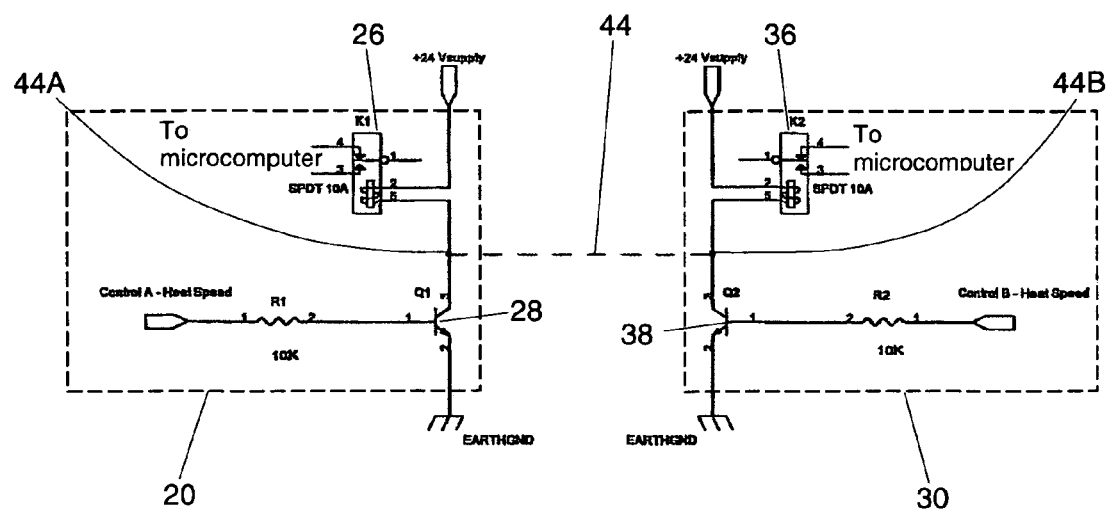
FIG. 3 is a schematic illustration of one embodiment of a twinning control arrangement in accordance with the principles of the present invention.

Referring to FIG. 3, a first embodiment of a twinning control 20 comprises a microcomputer (not shown) that provides for both establishing and monitoring a twinning communication with at least one other control 30. The control 20 (control A) comprises a twinning connection that is connected via a single wire 44 with the at least one other control. The twinning connection 44A of control 20 is preferably a terminal, or other suitable connector for connecting a single wire between control 20 and at least one other control 30 (control B). The control 20 preferably provides a low voltage source through a sensing means 26 to the twinning connection 44A. Likewise, the at least one other control 30 also preferably comprises a low voltage source through a sensing means 36 to the twinning connection 44B, which is connected via wire 44 to connection 44A. The low voltage source may be an alternating current power source, such as a 24 VAC transformer power supply in connection with the control 20. When control 20 actuates switching means 28, the voltage at twinning connections 44A and 44B are switched to ground, to establish a low voltage twinning signal that is conducted through sensing means 26 in control 20, as well as through sensing means 36 in control 30. Thus, control 20 may actuate switching means 28 to establish a low voltage twinning signal that is sensed by at least one other control 30 to enable control 20 to communicate with at least one other control 30. Likewise, when control 30 actuates switching means 38, the low voltage signal at twinning connections 44B and 44A are switched to ground, to establish a low voltage twinning signal that is conducted through sensing means 36 as well as sensing means 26 in control 20. Thus, the sensing means 26 and 36 in both controls provide for sensing a twinning voltage signal, to enable communication between control 20 and control 30.

The control 20 comprises a sensing means 26, which generally comprises a relay having a relay coil 28. Actuating the switching means 28 switches the voltage source to actuate the relay coil 28, which operates to switch a pair of contacts being monitored by a microcomputer via an analog-to-digital input or similar input means. The microcomputer may be configured to receive a low voltage communication signal through the relay contacts (from 1 to 4) when the switching means 28 is not actuated, wherein actuation of the switching means 28 interrupts the low voltage communication signal through the relay contacts to pull the voltage input to the microcomputer low. Alternatively, the microcomputer may be configured to receive no voltage communication signal through the relay contacts (from 1 to 4) when the switching means 28 is not actuated, wherein actuation of the switching means 28 applies the low voltage communication signal through the relay contacts to pull the voltage input to the microcomputer high. In either configuration, actuation of switching means 26 switches the voltage at the twinning connection to ground to establish a low voltage twinning signal that is conducted through the sensing means in each control for providing communication of a blower speed.

Upon receiving a signal from the thermostat 40 requesting heating or cooling for the space, the control 20 will initiate operation of the blower 24 at a specific speed. To ensure that the other twinned control 30 establishes operation of its blower 34 at the same time and at the same speed as blower 24, control 20 generates a low voltage twinning signal for communicating a planned blower speed to the other twinned control 30 via a twinning connection. The twinning connection may be established between the controls by either a single wire 44 and a common ground for the controls, or by a two wire connection. The control 20 generates a low voltage twinning signal by switching the 24 vac signal at the twinning connection to ground for a predetermined period of time, relative to a reference point in time. The control 20 comprises a microcomputer (or microprocessor) that monitors the point at which the 24 volt alternating current wave form crosses zero volts, and controls actuation of a switching means 28 relative to the zero crossing point. The microcomputer preferably senses the zero volt point through a voltage sensing circuit such as a voltage comparator, or the like. The switching means 28 switches the voltage at the twinning connection node 44A to reference ground to establish a low voltage twinning signal in the sensing means 26, which pulls a voltage communication signal low (or high) for a certain time period. The microcomputer monitors the voltage communication signal to determine the period of time the signal is pulled low (or high), which provides for communication of a prescribed blower speed to each control.

Figure 2A:
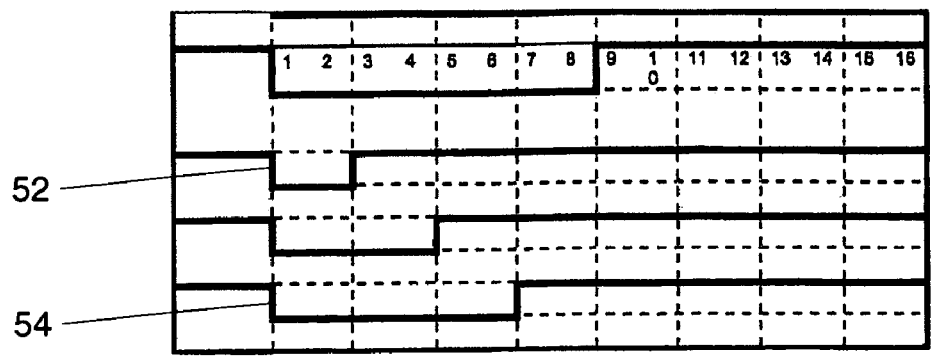
FIG. 2A is an illustration of switching signals of a first, second, and third predetermined duration, corresponding to a first, second and third blower speed.

Upon detecting the zero voltage crossing and rising voltage magnitude of the 24 vac signal, the microprocessor of control 20 is configured to actuate a switching means 28 for switching the voltage at the twinning connection node 44A to reference ground, which causes the sensing means 26 to pull the voltage communication signal low to the microcomputer. The microcomputer preferably actuates the switching means 28 for a predetermined period of time starting from a reference time that begins when the voltage of the 24 vac source crosses zero. In the first embodiment, the predetermined period of time is a fraction of an alternating current line cycle, such as $2/16$ of a 60 Hz line cycle. The microcomputer actuates the switching means 28 for at least one of a plurality of predetermined time periods that correspond to at least one of a plurality of blower speeds, such as a fan speed, a heat speed, and a cool speed. Based on the duration of time in which the voltage at the twinning connection is conducted to ground (or the voltage signal is pulled low), the time duration communicates a blower speed at which the control 20 is planning to operate blower 24. For example, the microprocessor of the first control may actuate the switching means 28 and cause the sensing means 26 to pull the voltage communication signal low for a duration of 2/16 of a 60 Hz line cycle. This would yield a signal indicative of a low blower speed for fan operation, as shown in the first line 52 of FIG. 2A. Likewise, the microprocessor of the first control may actuate the switching means 28 and cause the sensing means 26 to pull the voltage signal low for a duration of 6/16 of a 60 Hz line cycle, which would yield a signal indicative of a cool speed as shown in the third line 54 of FIG. 2A. It should be noted that any number of blower speeds may be communicated using the above method of switching voltage for different durations of time. The switching means 28 in the first embodiment is preferably a transistor switching device as shown in FIG. 3, but may alternatively comprise a relay or other suitable switching device. It should be noted that the at least one other twinned control 30 may be identical to control 20, and may also simultaneously generate its own twinning voltage signal at node 44B in the same manner.

Both controls 20 and 30 accordingly may generate twinning voltage signals that are conducted to each other via a single wire or equivalent connection link to provide for communication. Where both controls 20 and 30 are connected to individual 24 vac transformers that are in phase with each other, i.e. the voltage of each transformer crosses zero and rise at the same time, the twinning voltages are also in phase with each other. When the thermostat 40 sends a signal requesting heating operation, each control will begin operation of its respective HVAC unit. For example, during the start of positive line cycle, the microprocessor of control 20 may actuate the switching means 28 for switching the voltage at twinning connection node 44A to ground for a duration of 2/16 of a 60 Hz line cycle, which would cause sensing means 26 and 36 to pull the voltage communication signal low for the same time. The second control 30 may simultaneously actuate its switching means 38 for a duration of 4/16 of a 60 Hz line cycle, which would cause sensing means 26 and 36 to pull the voltage communication signal low for the same time duration. In such a situation, the switching means 38 of the second control 30 will switch the voltage at node 44B on the second control and the voltage at node 44A on the first control 20 to reference ground, such that a twinning voltage signal is conducted through both sensing means 26 and 28 of both controls for 4/16 of a line cycle. Thus, the communication voltage signal to each microcomputer will be pulled low for 4/16 of a line cycle by the sensing means 26 and 36 of both controls 20 and 30, even though control 20 actuated switching means 28 for only 2/16 of a line cycle. Thus, the control that actuates its switching means to conduct the voltage at the twinning connection to ground for the longest duration will establish priority over twinning signals generated by another control.

Figure 2B:
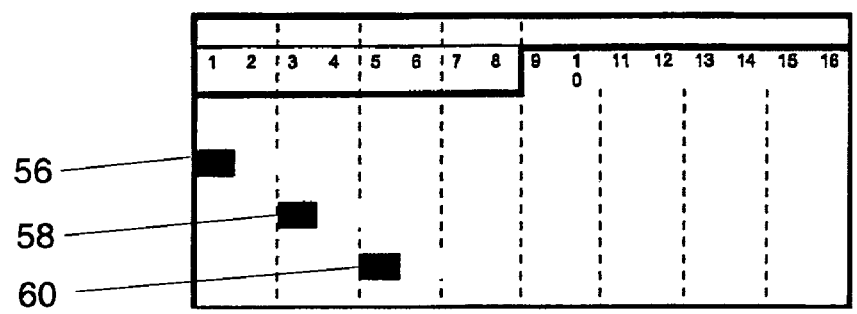
FIG. 2B is an illustration of time periods in which a twinning voltage signal may be monitored for determining the duration of a pull down of the voltage signal.

Both controls 20 and 30 (controls A & B) comprise sensing means 26 and 36 that are capable of monitoring or sensing the conduction of a twinning voltage signal and pulling a communication voltage signal low for the time period that the twinning voltage signal is conducted through by switching means 28 and 38. Both controls 20 and 30 each responsively control the speed of blowers 24 and 34 according to a communicated blower speed corresponding to the sensed duration that the twinning voltage signal conducted to ground, or the communication voltage signal is being pulled low. The communication voltage signal is preferably monitored at specific time periods relative to the reference zero crossing, as illustrated by the bars 56, 58, and 60 shown in FIG. 2B. Where the microcomputer of control 20 senses the communication voltage signal from 26 is being pulled low during only the first specific time period, the microcomputer determines that the twinning voltage signal is low for 2/16 of a 60 Hz line cycle, indicating a low blower speed for fan operation. Where the microcomputer of control 20 senses the communication voltage signal from 26 is being pulled low during all of the specific time periods, the microcomputer determines that the communicated twinning voltage signal is low for 6/16 of a 60 Hz line cycle, indicating a high blower speed for cooling operation. The duration of time that the communication voltage signal is pulled low may be increased to indicate an increased blower speed. Thus, a longer signal duration indicative of a higher blower speed establishes priority over a shorter signal duration indicative of a lower blower speed. This ensures that neither blower 24 or 34 will be operated at a lower speed than the other.

Figure 2C:
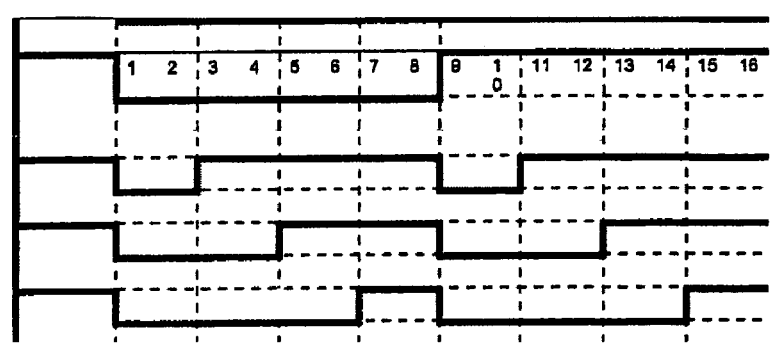
FIG. 2C is an illustration of switching signals of a first, second, and third predetermined duration, in both positive and negative halves of an alternating current line e cycle.
Figure 2D:
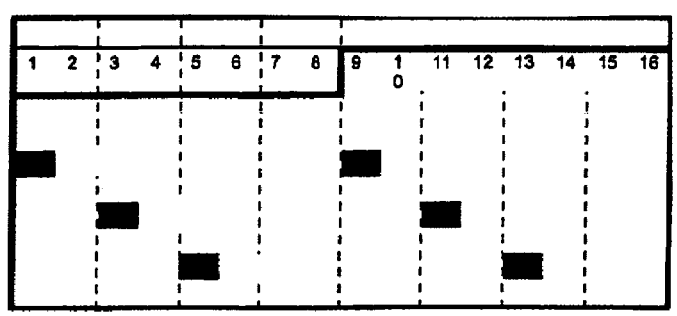
FIG. 2D is an illustration of time periods in which a twinning voltage signal is monitored for pull down duration during both positive and negative line cycles.

Referring to FIGS. 2C and 2D, some embodiments further provide for twinning control of one or more HVAC systems that each have individual transformers that are out of phase with each other. Where both controls 20 and 30 are connected to individual 24 vac transformers that are out of phase with each other, i.e. the voltage of each transformer crosses zero but one voltage is rising and the other is falling, the twinning signals are out of phase with each. If control 20 only monitored the twinning voltage signal when its transformer line voltage is positive (during which time the other transformer voltage is negative), and control 30 only monitored the twinning voltage signal when its transformer line voltage is positive, each control would be monitoring the twinning signal at different times and would not be capable of sensing the twinning signal generated by the other. Accordingly, upon detecting the point at which the voltage of the twinning signal crosses a zero value, the microprocessor of control 20 will also actuate switching means 28 to switch voltage at twinning connection node 44A to ground. The control 20 will switch the twinning signal voltage to ground regardless of whether the voltage is positive or negative. The negative voltage will still establish a twinning voltage signal through the relay coil, which will responsively switch the pair of contacts being monitored by a microcomputer and pull the voltage communication signal low to the microcomputer. This will generate a communication voltage signal to the microcomputer during the negative phase of the alternating line cycle that mirrors the positive phase, as shown in FIG. 2C. The microcomputer of each control 20 and 30 will monitor or sense the conduction of voltage at the twinning connection to ground at discrete time periods relative to the reference zero crossing, during both the positive and negative halves of an alternating current line cycle, as represented by the bar graphs in FIG. 2D. When the thermostat 40 sends a signal requesting heating operation, each control will begin operation of its respective HVAC unit. When the microprocessor of control 20 actuates the switching means 28 (during a positive line cycle) to cause the sensing means 26 to pull the communication voltage signal low for a duration of 2/16, and the second control 30 actuates the switching means 36 (during a negative line cycle) to cause the sensing means 36 to pull the twinning voltage low for a duration of 4/16 of a line, the communication voltage signal to each microcomputer is pulled low for a duration of 4/16 of a line cycle. Thus, even if both controls 20 and 30 are connected to 24 vac transformers that are out of phase, both controls 20 and 30 will see a conducted twinning voltage, or a communication voltage pulled low, for a duration of 4/16 of a 60 Hz line cycle. Thus, the control conducting the voltage at the twinning connection to ground for the longest duration will have priority over the other, regardless of whether one control 20 is out of phase with the other control 30. Accordingly, both controls 20 and 30 are capable of sensing the twinning voltage signal and responsively controlling the operation of their respective blowers 24 and 34 at the same prescribed blower speed corresponding to the duration that the twinning signal is being pulled low.

Figure 4:
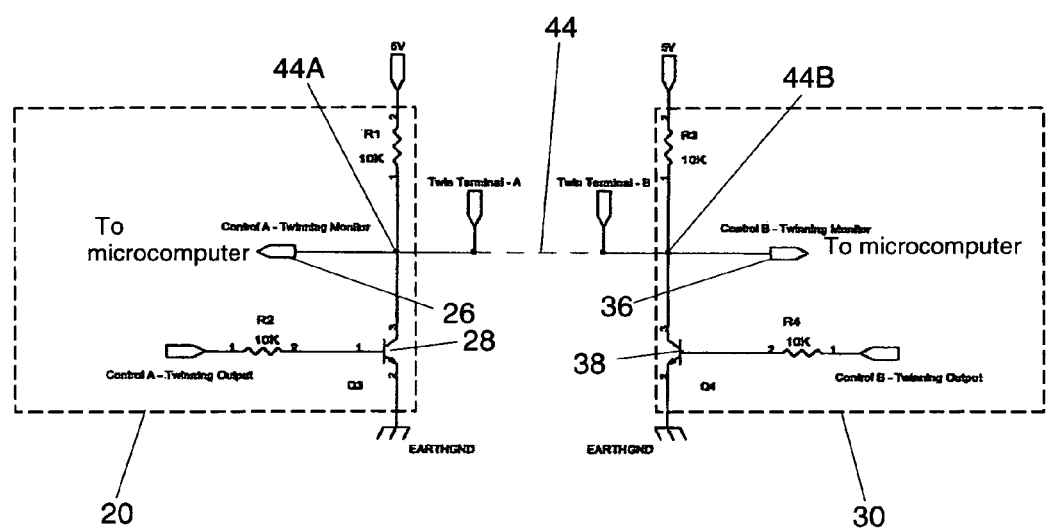
FIG. 4 is a schematic illustration of a second embodiment of a twinning control arrangement in accordance with the principles of the present invention.

In an alternate embodiment shown in FIG. 4, a control for communicating with another control is provided that comprises a twinning connection 44 between the control and at least one other control, and a direct current low voltage source applied to a twinning connection 44A. In the alternate embodiment, the direct current low voltage signal is a 5 volt signal provided by the power supply included in the control 20, or by some other suitable low voltage direct current source such as a battery. The control comprises a microcomputer input 26 in communication with the twinning connection 44A, where the voltage to the microcomputer input 26 is high when the twinning voltage at the twinning connection is not switched to reference ground. The microcomputer is also in communication with a switching means 28 for switching the twinning voltage to reference ground. When the microcomputer actuates the switching means 28 to switch the twinning voltage to ground, the microcomputer input 26 is pulled low. Thus, the control 20 comprises a microcomputer in communication with the twinning connection 44A and a switching means 28 for switching the twinning voltage to a reference ground to pull the voltage signal at the twinning connection 44A and microcomputer input 26 low. Upon detecting the zero voltage crossing point of the 24 volt alternating current source for control 20, the microprocessor of control 20 is configured to actuate a switching means 28 for switching the direct current twinning voltage at node 44A to reference ground. The microcomputer accordingly may actuate the switching means 28 to pulls the twinning voltage signal low for a predetermined time period. Likewise the microcomputer of the at least one other control actuates its switching means 38 to pull the twinning voltage signal low for a predetermined time period. The control that actuates its switching means to switch the twinning voltage at 44A and 44B to reference ground for the greatest duration will establish priority over twinning voltage signals conducted by other controls. Each control 20 and 30 also monitors the time period that the twinning voltage at twinning connections at 44A and 44B are switched, to determine the duration of time that the twinning voltage signal is being pulled low. Accordingly, the first control 20 and the at least second control 30 are both capable of communicating a blower speed signal, and are both capable of determining a prescribed blower speed signal based on the duration of time in which the twinning voltage signal is being pulled low.

In some embodiments of the present invention, a control 20 is provided that further comprises a diagnostic communication feature, which could provide troubleshooting information such as whether the phasing might prevent twinning in a given application. For example, a first control 20 could determine from the twinning signal that the voltage of at least one other control 30 that is supplied by a second transformer is not 180 degrees out of phase with the transformer of the first control and does not cross zero volts at the same time. The control 20 would be capable of providing a diagnostic signal indicating that twinning would be prevented, and why.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A control associated with a first HVAC unit that is coupled to a common duct shared with at least one other HVAC unit, the control comprising:
   a twinning connection in communication with at least one other control associated with the at least one other HVAC unit;
   a low voltage signal applied to the twinning connection;
   a sensing means for sensing when the voltage at the twinning connection is being conducted to ground;
   a switching means for switching the voltage at the twinning connection to ground; and
   a microcomputer in communication with the sensing means and the switching means, the microprocessor being configured to actuate the switching means to switch the voltage at the twinning connection to ground for a predetermined time period to communicate a blower speed for the first HVAC unit, and to monitor the sensing means to determine the period of time that the voltage at the twinning connection is being conducted to ground which corresponds to a prescribed blower speed for each HVAC unit, wherein the microprocessor responsively controls the speed of the blower associated with the first HVAC unit according to the prescribed blower speed corresponding to the sensed period of time.

2. The control of claim 1 wherein the twinning connection comprises a terminal that is connected to a single wire in connection with the at least one other control associated with the at least one other HVAC unit.

3. The control of claim 1 wherein the low voltage signal is a low voltage direct current power source that is connected to the twinning connection.

4. The control of claim 3 wherein the microcomputer actuates the switching means for at least one of a plurality of predetermined time periods that correspond to at least one of a plurality of prescribed blower speed.

5. The control of claim 4 wherein the switching means that switches the voltage at the twinning connection for the greatest period of time corresponds to a prescribed blower speed for cooling operation of the HVAC system.

6. The control of claim 4 wherein the predetermined time period having the least duration corresponds to a prescribed blower speed for fan operation of the HVAC system.

7. The control of claim 1 wherein the low voltage signal is a low voltage alternating current power source that is connected to the twinning connection.

8. The control of claim 7 wherein the microcomputer actuates the switching means for a predetermined time period starting from a reference time that begins when the voltage of the alternating current source crosses zero.

9. The control of claim 8 wherein the microcomputer actuates the switching means for at least one of a plurality of predetermined time periods that correspond to at least one of a plurality of prescribed blower speed.

10. The control of claim 9 wherein the predetermined time period having the greatest duration corresponds to a prescribed blower speed for cooling operation of the HVAC system.

11. The control of claim 9 wherein the switching means that switches the voltage at the twinning connection for the greatest period of time corresponds to a prescribed blower speed for cooling operation of the HVAC system.

12. A control associated with a first HVAC unit and in communication with at least one other control associated with at least one other HVAC unit that is coupled to a common duct with the first HVAC unit, the control comprising:
   a twinning connection in communication with at least one other control associated with the at least one other HVAC unit;
   a sensing means for sensing when a voltage at the twinning connection is being conducted to ground;
   a low voltage signal applied to the twinning connection through the sensing means;
   a switching means for switching the voltage at the twinning connection to ground; and
   a microcomputer for controlling the switching means and monitoring the sensing means to communicating with at least one other control associated with the at least one other HVAC unit, the microcomputer being configured to actuate the switching means to switch the voltage at the twinning connection to ground for a predetermined time period to communicate a blower speed for the first HVAC unit to the at least one other control, wherein the microprocessor monitors the sensing means to determine the period of time that the voltage at the twinning connection is being conducted to ground, and responsively controls the speed of the blower associated with the first HVAC unit according to the prescribed blower speed corresponding to the sensed period of time.

13. The control of claim 12 wherein the microcomputer provides and monitors communication with the at least one other control through a terminal that is connected to a single wire in connection with the at least one other control.

14. The control of claim 12 wherein the microcomputer actuates the switching means for at least one of a plurality of predetermined time periods that correspond to at least one of a plurality of prescribed blower speed.

15. The control of claim 12 wherein the switching means that switches the voltage at the twinning connection for the greatest period of time corresponds to a prescribed blower speed for cooling operation of the HVAC system.

16. The control of claim 14 wherein the predetermined time period having the least duration corresponds to a prescribed blower speed for fan operation of the HVAC system.

17. A first control associated with a first HVAC unit in combination with at least a second control associated with at least a second HVAC unit coupled to a common duct with the first HVAC unit, the combination comprising:
   a twinning connection between the first control and the at least second control, for communicating a twinning signal indicative of a blower speed for each HVAC unit;
   a first alternating current low voltage source applied to the twinning connection;
   a second alternating current low voltage source applied to the twinning connection, the second alternating current low voltage source being out of phase with the first alternating current low voltage source;
   a first control having a microcomputer for controlling a switching means for switching the voltage applied at the twinning connection to ground, and a sensing means for sensing when the voltage at the twinning connection is being conducted to ground, the microprocessor being configured to actuate the switching means to switch both a positive or a negative voltage at the twinning connection to ground for a predetermined time period to communicate a blower speed for the first HVAC unit; and
   at least a second control having a microcomputer for controlling a switching means for switching the voltage at the twinning connection to ground, and a sensing means for sensing when the voltage at the twinning connection is being conducted to ground, the microprocessor being configured to actuate the switching means to switch both a positive or a negative voltage at the twinning connection to ground for a predetermined time period to communicate a blower speed for the second HVAC unit;
   wherein the microcomputer of the first control and the microcomputer of the at least second control both monitor the twinning connection to sense the period of time that the voltage at the twinning connection is being conducted to ground which corresponds to a prescribed blower speed for each HVAC unit, and
   wherein each control responsively controls the speed of the blower associated with its respective HVAC unit according to the prescribed blower speed corresponding to the sensed period of time.

18. The combination of claim 17 wherein the microcomputer of each control actuates its respective switching means for a predetermined time period starting from a reference time point that begins when the control's alternating current voltage source crosses zero volts.

19. The combination of claim 18 wherein each microcomputer actuates its respective switching means for at least one of a plurality of predetermined time periods that correspond to at least one of a plurality of prescribed blower speed.

20. The combination of claim 19 wherein the control that actuates its switching means to switch the voltage at the twinning connection to ground for the greatest period of time establishes priority over the other controls to prescribe an operating blower speed for each blower associated with each HVAC unit.

* * * * *